Aug. 14, 1962   A. BRUEDER   3,049,149
THREE-WAY SLIDE VALVE WITH ADJUSTABLE OVERLAP
Filed Dec. 20, 1960

United States Patent Office 3,049,149
Patented Aug. 14, 1962

3,049,149
THREE-WAY SLIDE VALVE WITH ADJUSTABLE OVERLAP
Antoine Brueder, Paris, France, assignor to Societe Anonyme Andre Citroen, Paris, France
Filed Dec. 20, 1960, Ser. No. 77,115
Claims priority, application France Dec. 22, 1959
4 Claims. (Cl. 137—625.17)

This invention relates in general to three-way slide valves and has specific reference to a three-way slide-valve of the type comprising a body through which two ducts communicating with a source of fluid under pressure and with the exhaust of a hydraulic circuit are formed, as well as a third duct communicating with a member to be actuated hydraulically, and a slide-valve member adapted to slide in said body between an intermediate position closing the third duct and two end positions wherein said third duct communicates with said source and said exhaust respectively.

When a valve of this general type is used in a regulating system, the stroke of the slide-valve member, from the feed position to the exhaust position and vice-versa, should be as small as possible, and in certain cases this stroke must have a predetermined value.

In those cases where a fluid under a relatively high pressure is used, these requirements are difficult to meet for, at very small slide-valve apertures, the outputs are relatively important, so that adjustments and dimensional tolerances of the order of the thousandth of an inch must be adhered to.

It is the object of this invention to provide a valve of the type generally set forth hereinabove, wherein the stroke of the slide-valve member for switching the valve from the feed position to the exhaust position, that is, the valve overlap, is adjustable in length, so that this valve can be adapted very accurately to the specific application contemplated, or, when this valve is incorporated in an assembly subjected to a long period of operation, the variations in this overlap value which may result from wear and tear can be corrected to restore the desired values.

In this valve the cavity formed in the slide-valve member and which, as a consequence of the axial sliding movement of the slide-valve in the valve body, uncovers the ports of the aforesaid ducts for admitting or exhausting the pressure fluid, as well as these ports themselves, are so shaped that the difference between the slide-valve cavity measured between these two ports has a variable value according to the angular position of the slide-valve member in the valve body, so that this difference constituting the valve overlap can be adjusted at will by varying the angular position of the slide valve about its axis in the valve body.

The features and advantages of this invention, as well as the manner in which the same may be embodied in practice, will become apparent from the following description of a few specific forms of embodiment shown by way of example in the accompanying drawing. In the drawing.

Figure 1:
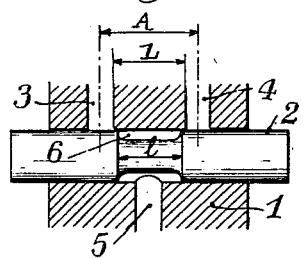
FIGURES 1 and 2 are longitudinal axial sections showing two known types of three-way valves, the sections being taken substantially along the axes of the three ports.

The known type of valve illustrated in FIG. 1 comprises a body 1 through which a cylindrical bore or cavity is formed and has slidably mounted therein a slide-valve member 2 and comprises a port 3 communicating with the source of fluid under pressure, a port 4 communicating with the exhaust and another port 5 communicating with the member to be actuated hydraulically and opening into the bore of the body 1. The cylindrical surface of the slide-valve member 2 of this example comprises a hollow or shallower portion in the form of a circular groove 6 communicating with the load port 5 irrespective of the position of the slide-valve member 2. The width $l$ of this groove is smaller than the distance L measured between the adjacent edges of the two ports 3 and 4. The valve overlap, that is, the stroke applicable to the slide-valve member 2 without connecting the port 5 with either of ports 3 or 4 is L—$l$. The dimension $l$ can be obtained with a certain degree of precision without difficulty, but the dimension L depends primarily on the distance A between centers and also on the two diameters of ports 3 and 4.

Figure 2:
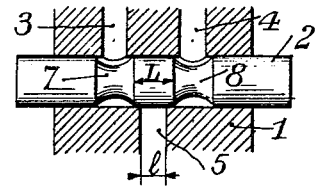

In the known slide-valve type shown in FIG. 2, the cylindrical surface of the slide-valve member 2 is formed with a pair of circular grooves 7, 8 constantly communicating with the two ports 3 and 4 respectively. In this case the valve overlap is the difference L—$l$ between the distance L measured between the edges of the two grooves and the width $l$ of the aperture formed by the port 2 in the bore of the valve body 1. In this case it is relatively simple matter to obtain the two dimensions L and $l$ directly with a sufficient precision, the same applying to the valve overlap.

This type of valve is satisfactory in most cases but in certain regulating arrangements a higher degree of precision is required and some means must be provided to permit the adjustment of the valve overlap.

In fact, in the above broad description of known devices, only the difference between the two dimensions L and $l$ is considered for determining the overlap, but actually other factors are involved, such as the play between the slide-valve member and its bore, the shape of the edges of the groove or of the ports, as these edges may be more or less blunt, or worn by erosion in the zone where the fluid flows.

FIGURES 3 to 6 illustrate valves constructed according to the teachings of this invention, wherein, as in FIG. 1, the cylindrical surface of the slide-valve member is formed with a single cavity or groove constantly communicating with the port 5, the overlap being however adjustable.

Figure 3:
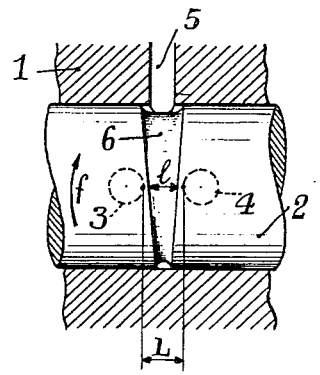
FIGURE 3 shows in section a valve constructed according to this invention, the section being taken substantially at right angles to the plane of the ports.

The valve illustrated in FIG. 3 differs from the example of FIG. 1 in that the two edges of the groove, instead of being limited by two parallel planes, are limited by two planes inclined with respect to each other. The useful width $l$ of the groove and the corresponding gap L between the edges of ports 3 and 4 can be varied according to the angular setting of the slide-valve member 2 in body 1. Thus, by adjusting this angular setting it is possible to vary at will the value of the valve overlap which increases when the slide-valve member 2 is rotated in the direction of the arrow $f$.

Figure 4:
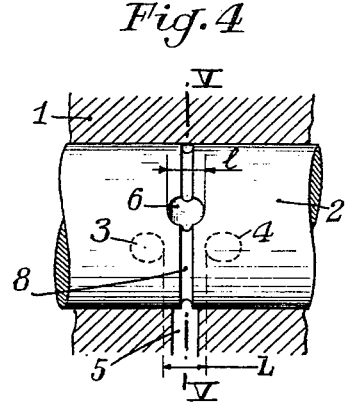
FIGURE 4 is a similar view showing a modified embodiment of this invention.
Figure 5:
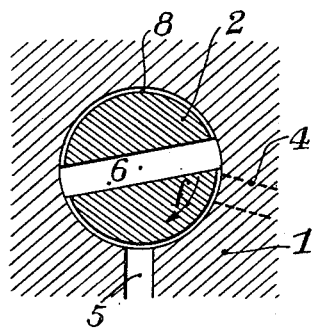
FIGURE 5 is a cross section taken upon the line V—V of FIG. 4.
Figure 6:
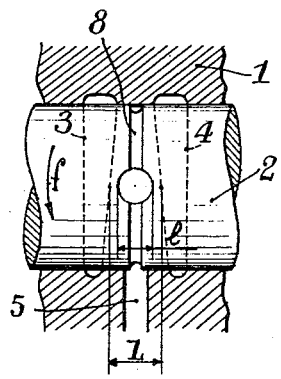
FIGURE 6 is a view similar to FIG. 4 showing a modified embodiment of the valve shown in FIGS. 4 and 5.

In the alternate embodiments illustrated in FIGS. 4 to 6, the overlap adjustment is also controlled by rotating the slide-valve member 2 in the valve body.

In the example illustrated in FIGS. 4 and 5 the groove or cavity 6 of slide-valve member 2 consists of a diametral channel for example of cylindrical configuration of which the two opposite apertures may be interconnected by a shallow circular groove 8 for balancing the pressures and communications with the load port 5. In this example the overlap decreases when the slide-valve member 2 is rotated in the body 1 in the direction of the arrow $f$.

The overlap is not equal to $L-l$ but a function of the angle of rotation of the slide-valve member 2.

In the alternate embodiment of FIG. 6 the ports 3 and 4 instead of opening with a circular aperture, as in FIG. 4, into the inner cylindrical wall of the bore formed in the body 1 for receiving the slide-valve member 2, consist of elongated contours or orifices extending along this inner wall, the adjacent edges of these apertures, that is, the edges disposed on either side of the substantially circular aperture of port 6, being substantially rectilinear and inclined in relation to each other. Thus, the overlap $L-l$ increases when the slide valve member 2 is rotated in the valve body 1 to move the aperture of port 6 in the direction of the divergence of the adjacent edges of ports 3 and 4, this direction being indicated by the arrow $f$.

The solutions proposed hereinabove and illustrated in the drawing are applicable to the so-called open-center valves wherein $L<l$, so that in the case illustrated in FIG. 1, for example, the fluid will flow without pressure, the device being inoperative.

In all forms of embodiment of this invention, the selected overlap adjustment position obtained by rotating the slide-valve member in the valve body is maintained by any suitable and known means locking the slide-valve member in the desired angular position.

Besides, many modifications and variations may be contemplated in the practical embodiment of this invention as will occur to anybody conversant with the art, without departing from the spirit and scope of the invention as set forth in the appended claims.

What I claim is:

1. An improved three-way slide valve with adjustable overlap comprising: a valve body defining a cylindrical bore having a longitudinal axis and three ports opening into said bore, said ports being spaced axially and arranged with one port intermediate the other two ports, said one port being a load port, and the other ports being respectively a pressure port and an exhaust port defining similar apertures; a slide-valve member mounted in said cylindrical bore of the valve body and axially slidable and angularly adjustable therein on said longitudinal axis, said member having passageway means with boundaries defining relative distances from said pressure and exhaust ports that vary with the angular adjustment of said member in said body, said passageway means being in constant communication with said load port and slidable axially to communicate with one of the other two ports.

2. An improved three-way slide valve as described in claim 1 wherein said passageway means comprises a circular groove having slides limited by two planes inclined with respect to each other, and said pressure and exhaust ports defining circular apertures.

3. An improved three-way slide valve as described in claim 1 wherein said passageway means comprises a diametrical channel having opposite apertures connected by a shallow circular groove for balancing the communication with said load port, and said pressure and exhaust ports defining circular apertures.

4. An improved three-way slide valve as described in claim 1 wherein said passageway means comprises a diametrical channel having opposite apertures connected by a shallow circular for balancing the communication with said load port and said pressure and exhaust ports defining elongated apertures that are inclined with respect to each other and have substantially linear sides transverse said longitudinal axis.

References Cited in the file of this patent

UNITED STATES PATENTS

| | | |
|---|---|---|
| 375,508 | Rodman | Dec. 27, 1887 |
| 2,202,216 | Madsen | May 28, 1940 |
| 2,380,705 | Proctor | July 31, 1945 |
| 2,686,650 | Evans | Aug. 17, 1954 |
| 2,766,834 | Boyer | Oct. 16, 1956 |
| 2,879,643 | Stroh et al. | Mar. 31, 1959 |
| 2,958,340 | Rosebrook | Nov. 1, 1960 |